(12) United States Patent
Zhang

(10) Patent No.: US 11,074,424 B2
(45) Date of Patent: Jul. 27, 2021

(54) DISPLAYING AND RECOGNIZING TWO-DIMENSIONAL CODE

(71) Applicant: Advanced New Technologies Co., Ltd., George Town (KY)

(72) Inventor: Di Zhang, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

(21) Appl. No.: 16/886,029

(22) Filed: May 28, 2020

(65) Prior Publication Data

US 2020/0293734 A1    Sep. 17, 2020

Related U.S. Application Data

(63) Continuation of application No. PCT/CN2019/074112, filed on Jan. 31, 2019.

(30) Foreign Application Priority Data

Mar. 29, 2018 (CN) .......................... 201810274082.7

(51) Int. Cl.
*G06K 7/14* (2006.01)
*G06K 9/00* (2006.01)

(52) U.S. Cl.
CPC ....... *G06K 7/1417* (2013.01); *G06K 9/00577* (2013.01)

(58) Field of Classification Search
CPC .......................... G06K 7/1417; G06F 17/3239
USPC ...................................................... 235/462.1
See application file for complete search history.

(56) References Cited

U.S. PATENT DOCUMENTS

| | | | | |
|---|---|---|---|---|
| 2017/0243096 | A1* | 8/2017 | Kotowski | ........ G06K 19/06037 |
| 2017/0316626 | A1* | 11/2017 | Smith | .............. G06K 19/06037 |
| 2018/0089940 | A1* | 3/2018 | Petersen | ............. G07F 17/3258 |
| 2018/0205556 | A1* | 7/2018 | Rieul | ........................ H04L 9/30 |
| 2019/0052697 | A1* | 2/2019 | Wu | ......................... H04L 67/06 |

(Continued)

FOREIGN PATENT DOCUMENTS

| | | |
|---|---|---|
| CN | 104464117 | 3/2015 |
| CN | 103593894 | 3/2016 |

(Continued)

OTHER PUBLICATIONS

Crosby et al., "BlockChain Technology: Beyond Bitcoin," Sutardja Center for Entrepreneurship & Technology Technical Report, Oct. 16, 2015, 35 pages.

(Continued)

*Primary Examiner* — Allyson N Trail
(74) *Attorney, Agent, or Firm* — Fish & Richardson P.C.

(57) ABSTRACT

This disclosure relates to displaying and recognizing two-dimensional codes. In one aspect, a method includes receiving, at a user device, an instruction for displaying a two-dimensional code. The user device obtains multiple two-dimensional codes corresponding to a user. The user device sequentially displays the multiple two-dimensional codes based on one or more predetermined time intervals, so that the multiple two-dimensional codes form a dynamic two-dimensional code on a display page. A ratio of each of the one or more predetermined time intervals to a validity period of each of the multiple two-dimensional codes is less than a predetermined threshold.

17 Claims, 4 Drawing Sheets

(56) References Cited

U.S. PATENT DOCUMENTS

| | | | | |
|---|---|---|---|---|
| 2019/0179585 A1* | 6/2019 | True | ............... | G06F 21/50 |
| 2019/0188436 A1* | 6/2019 | Tsou | ............... | G06F 3/147 |
| 2019/0373115 A1* | 12/2019 | Torikai | ............ | G06K 19/06037 |
| 2020/0027076 A1* | 1/2020 | Sharma | ............... | G06Q 20/202 |
| 2020/0074356 A1* | 3/2020 | Tseng | ............... | G07D 7/0043 |

FOREIGN PATENT DOCUMENTS

| | | |
|---|---|---|
| CN | 105373823 | 3/2016 |
| CN | 106656908 | 5/2017 |
| CN | 107172167 | 9/2017 |
| CN | 107704911 | 2/2018 |
| CN | 107798373 | 3/2018 |
| CN | 107808286 | 3/2018 |
| CN | 108681896 | 10/2018 |
| JP | 2014092831 | 5/2014 |
| TW | 201021498 | 6/2010 |

OTHER PUBLICATIONS

Nakamoto, "Bitcoin: A Peer-to-Peer Electronic Cash System," www.bitcoin.org, 2005, 9 pages.

PCT International Search Report and Written Opinion in International Application No. PCT/CN2019/074112, dated Apr. 28, 2019, 10 pages (with partial English translation).

* cited by examiner

DISPLAYING AND RECOGNIZING TWO-DIMENSIONAL CODE

CROSS-REFERENCE TO RELATED APPLICATIONS

This application is a continuation of PCT Application No. PCT/CN2019/074112, filed on Jan. 31, 2019, which claims priority to Chinese Patent Application No. 201810274082.7, filed on Mar. 29, 2018, and each application is hereby incorporated by reference in its entirety.

TECHNICAL FIELD

One or more implementations of the present specification relate to the field of computer technologies, and in particular, to methods and apparatuses for displaying and recognizing a two-dimensional code.

BACKGROUND

With the development of Internet technologies, two-dimensional codes are increasingly widely applied to people's lives. For example, people can initiate a payment collection, initiate a payment, take a bus, and take a subway by using two-dimensional codes displayed in end-user devices (for example, mobile phones or tablet computers).

However, currently, there is a case in which a two-dimensional code of a user is copied and used. For example, the two-dimensional code of the user is stolen, and consequently a fund loss to the user is caused. Alternatively, the user actively shares the two-dimensional code of the user with another user, and consequently a fund loss to a service provider is caused. Therefore, a reasonable solution needs to be provided to avoid a fund loss to a user or a service provider that is caused by copying and using a two-dimensional code.

SUMMARY

One or more implementations of the present specification describe methods and apparatuses for displaying and recognizing a two-dimensional code, to prevent a two-dimensional code of a user from being copied and used by displaying and recognizing a dynamic two-dimensional code of the user.

According to a first aspect, a method for displaying a two-dimensional code is provided, and includes: receiving an instruction for displaying a two-dimensional code from a user; obtaining multiple two-dimensional codes corresponding to the user; and sequentially displaying the multiple two-dimensional codes based on a predetermined time interval, so that the multiple two-dimensional codes form a dynamic two-dimensional code on a display page, where a ratio of the predetermined time interval to a validity period of each of the multiple two-dimensional codes is less than a predetermined threshold.

In an implementation, the obtaining multiple two-dimensional codes corresponding to the user includes: sending a first request to a server, where the first request is used to request the multiple two-dimensional codes; and receiving the multiple two-dimensional codes from the server.

Further, the first request is further used to request the predetermined time interval.

In an implementation, the obtaining multiple two-dimensional codes corresponding to the user includes: generating the multiple two-dimensional codes based on seed data pre-obtained from a server.

In an implementation, the multiple two-dimensional codes include multiple groups of two-dimensional codes, and each of the multiple groups of two-dimensional codes includes a first quantity of two-dimensional codes, and the sequentially displaying the multiple two-dimensional codes based on a predetermined time interval includes: displaying the first quantity of two-dimensional codes in each group based on a first time interval, and displaying each group of two-dimensional codes based on a second time interval.

According to a second aspect, a method for recognizing a two-dimensional code is provided, and includes: sequentially reading a predetermined quantity of two-dimensional codes from a dynamic two-dimensional code displayed on a display page, to obtain corresponding two-dimensional code data, where the dynamic two-dimensional code includes multiple two-dimensional codes sequentially displayed based on a predetermined time interval; and sending the two-dimensional code data to a server, so that the server verifies each of the predetermined quantity of two-dimensional codes.

In an implementation, the sequentially reading a predetermined quantity of two-dimensional codes from a dynamic two-dimensional code displayed on a display page includes: continuously reading the dynamic two-dimensional code for at least predetermined duration until the predetermined quantity of two-dimensional codes are read.

In an implementation, the sequentially reading a predetermined quantity of two-dimensional codes from a dynamic two-dimensional code displayed on a display page includes: reading the dynamic two-dimensional code based on a predetermined third time interval until the predetermined quantity of two-dimensional codes are read.

According to a third aspect, an apparatus for displaying a two-dimensional code is provided, and includes: a receiving unit, configured to receive an instruction for displaying a two-dimensional code from a user; an acquisition unit, configured to obtain multiple two-dimensional codes corresponding to the user; and a display unit, configured to sequentially display the multiple two-dimensional codes based on a predetermined time interval, so that the multiple two-dimensional codes form a dynamic two-dimensional code on a display page, where a ratio of the predetermined time interval to a validity period of each of the multiple two-dimensional codes is less than a predetermined threshold.

According to a fourth aspect, an apparatus for recognizing a two-dimensional code is provided, and includes: a reading unit, configured to sequentially read a predetermined quantity of two-dimensional codes from a dynamic two-dimensional code displayed on a display page, to obtain corresponding two-dimensional code data, where the dynamic two-dimensional code includes multiple two-dimensional codes sequentially displayed based on a predetermined time interval; and a sending unit, configured to send the two-dimensional code data to a server, so that the server verifies each of the predetermined quantity of two-dimensional codes.

According to a fifth aspect, a computer-readable storage medium is provided, where the computer-readable storage medium stores a computer program, and when the computer program is executed in a computer, the computer is enabled to perform the method in the first aspect or the second aspect.

According to a sixth aspect, a computing device is provided, and includes a memory and a processor, where the memory stores executable code, and when the processor executes the executable code, the method in the first aspect or the second aspect is implemented.

According to the methods and apparatuses for displaying and recognizing a two-dimensional code provided in the implementations of the present specification, when the instruction for displaying a two-dimensional code is received from the user, the multiple two-dimensional codes are obtained, and the multiple obtained two-dimensional codes are sequentially displayed based on the predetermined time interval, so that the multiple two-dimensional codes form a dynamic two-dimensional code on the display page. In addition, the predetermined quantity of two-dimensional codes are sequentially read from the dynamic two-dimensional code display page, to obtain the corresponding two-dimensional code data, and then the two-dimensional code data is sent to the server, so that the server verifies each of the predetermined quantity of two-dimensional codes, and determines that verification on the two-dimensional code data succeeds only when verification on all of the predetermined quantity of two-dimensional codes succeeds. As such, the two-dimensional code displayed on the display page can be effectively prevented from being copied and used, and accuracy of recognition and verification results can be improved, to avoid a loss to the user and/or a service provider.

BRIEF DESCRIPTION OF DRAWINGS

To describe the technical solutions in the implementations of the present disclosure more clearly, the following briefly describes the accompanying drawings needed for describing the implementations. Clearly, the accompanying drawings in the following description show merely some implementations of the present disclosure, and a person of ordinary skill in the art can further derive other drawings from these accompanying drawings without creative efforts.

DESCRIPTION OF IMPLEMENTATIONS

The following describes the solutions provided in the present specification with reference to the accompanying drawings.

Figure 1:
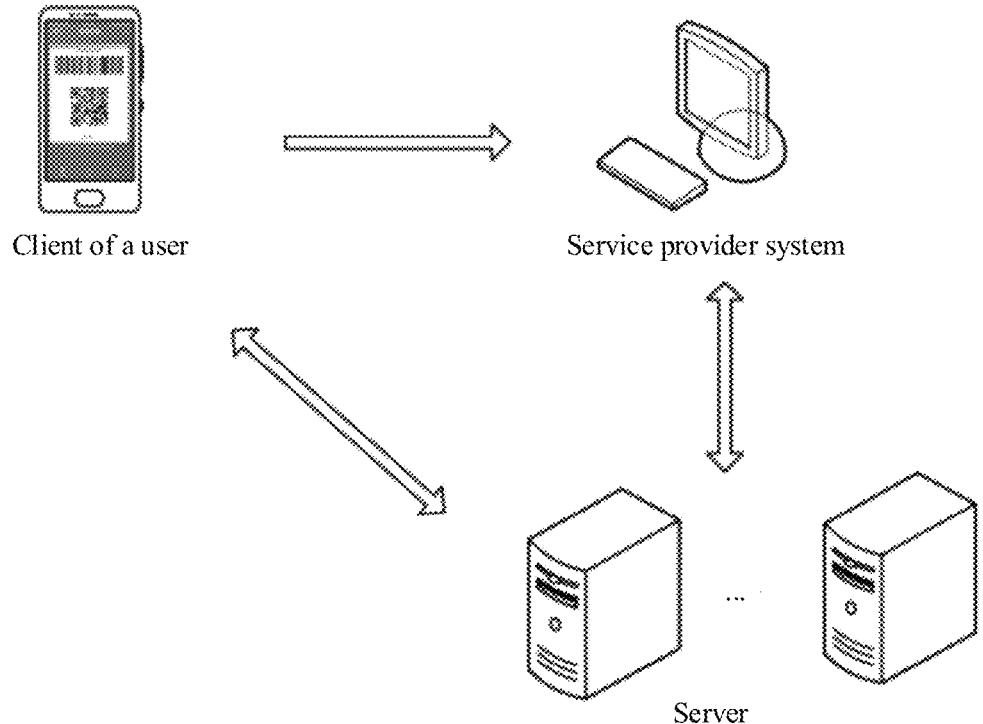
FIG. 1 is a schematic diagram illustrating an implementation scenario of an implementation, according to the present specification.

FIG. 1 is a schematic diagram illustrating an implementation scenario of an implementation, according to the present specification. As shown in the figure, a user can log in to a client (for example, ALIPAY) of the user by using an end-user device (for example, a smartphone or a tablet computer), to enter a display page of a two-dimensional code. Two-dimensional codes displayed on the display page can be obtained by the client of the user by requesting a server online, or can be generated by the client of the user offline. These two-dimensional codes all correspond to account information (for example, an ALIPAY account number) of the user in the client. A service provider system (for example, a merchant system) can scan, by using a two-dimensional code scanning device (for example, a POS machine or a scanner), a two-dimensional code displayed in the end-user device of the user, and upload scanned two-dimensional code data and information about a service provider to the server (for example, an ALIPAY server). The server can verify the two-dimensional code data received from the service provider system. When the verification succeeds, the server enters a subsequent procedure (for example, a payment procedure), and notifies the user and/or the service provider of a result related to the verification and subsequent procedure processing (for example, a verification success or a verification failure).

In the scenario shown in FIG. 1, methods in the implementations of the present specification can be used to display and recognize a two-dimensional code. The methods are based on observation and collected statistics: A validity period with specific duration is usually set for a two-dimensional code, for example, a payment code of a user. On a two-dimensional code display page, the two-dimensional code is updated and displayed based on the validity period (for example, 60 s) of the two-dimensional code. This means that a longer display time of each two-dimensional code indicates that the two-dimensional code is more likely to be copied and used. For example, within a validity period of a two-dimensional code, a wrongdoer can steal the two-dimensional code displayed on a display page, for example, photographs the display page of the two-dimensional code, and uses the two-dimensional code, and consequently user identity information is illegally used or an account fund loss is caused. Alternatively, a user can perform a screenshot operation, etc. on a display page of a two-dimensional code within a validity period of the two-dimensional code, to obtain a two-dimensional code picture, and actively shares the two-dimensional code picture with another user, so that the other user can use the two-dimensional code within the validity period of the two-dimensional code to enjoy a service provided by a service provider, etc, and consequently the service provider cannot collect correct user information or a fund loss to the service provider is caused.

To prevent a two-dimensional code from being copied and used, in the methods in the implementations of the present specification, after an instruction for displaying a two-dimensional code is received from a user, multiple two-dimensional codes corresponding to the user are obtained, and then the multiple obtained two-dimensional codes are sequentially displayed based on a predetermined time interval, so that the multiple two-dimensional codes form a visually dynamic two-dimensional code on a display page. That is, it is perceived from the display page that the two-dimensional code continuously changes to display, and a pattern of each two-dimensional code cannot be clearly determined. Correspondingly, during recognition of a two-dimensional code, a predetermined quantity of two-dimensional codes instead of one two-dimensional code are sequentially read from the dynamic display page of the two-dimensional codes, to obtain corresponding two-dimensional code data. Then, the obtained two-dimensional code data is sent to a server for verification. Only when verification on all of the two-dimensional code data corresponding to the predetermined quantity of two-dimensional codes succeeds, it can be determined that verification on the two-dimensional code data succeeds. Otherwise, it is determined that verification on the two-dimensional code data fails. As such, when the user uses the two-dimensional code by using the display page of the two-dimensional code, the two-dimensional code displayed on the display page can be effectively prevented from being copied and used, to avoid a loss to the user and/or a service provider. The following describes a specific execution process of the method.

Figure 2:
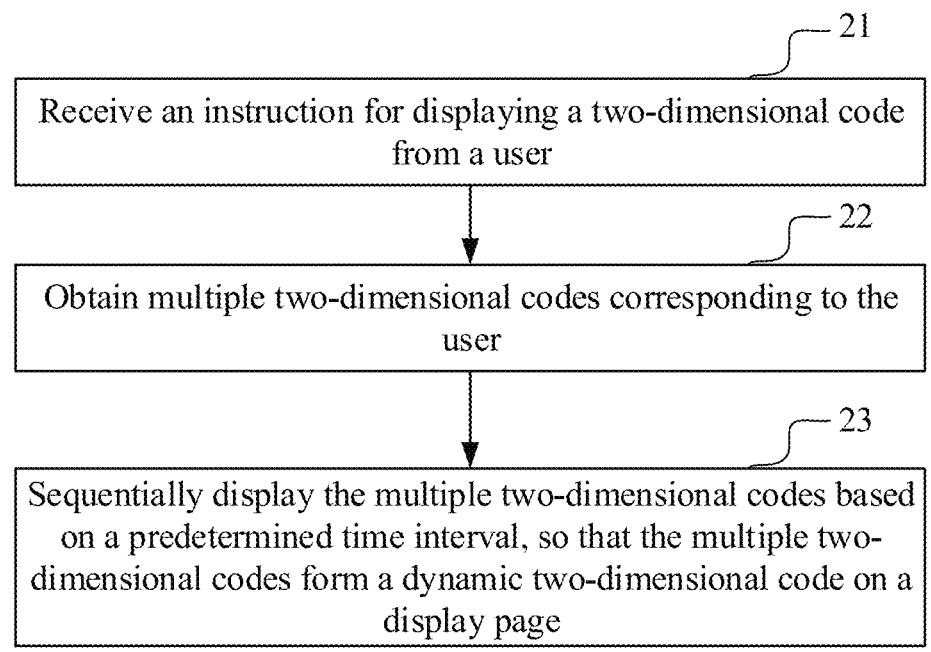
FIG. 2 is a flowchart illustrating a method for displaying a two-dimensional code, according to an implementation.

FIG. 2 is a flowchart illustrating a method for displaying a two-dimensional code, according to an implementation. The method can be performed by a client for displaying a two-dimensional code of a user, a plug-in in a client, an end-user device in which a client is installed, etc. As shown in FIG. 2, the method includes the following steps: Step 21: Receive an instruction for displaying a two-dimensional code from a user. Step 22: Obtain multiple two-dimensional codes corresponding to the user. Step 23: Sequentially display the multiple two-dimensional codes based on a predetermined time interval, so that the multiple two-dimensional codes form a dynamic two-dimensional code on a display page. The following describes an execution process of the steps with reference to a specific example.

First, in step 21, the instruction for displaying a two-dimensional code is received from the user.

In an implementation, the received instruction can be an instruction that is for entering the two-dimensional code display page and is entered by the user.

In an implementation, the two-dimensional codes that need to be displayed can correspond to different types of information based on an actual application situation. In an example, the client can have a payment function, and the corresponding displayed two-dimensional code can be a payment code that includes user account information, for example, a payment code in ALIPAY. In another example, the client can have an identity information display function, and the corresponding displayed two-dimensional code can be an identity code that includes user identity information.

Next, in step 22, the multiple two-dimensional codes corresponding to the user are obtained.

Specifically, the multiple obtained two-dimensional codes all correspond to the requesting user. That is, each of the multiple two-dimensional codes corresponds to user information, for example, corresponds to an identifier (for example, an ALIPAY account number of the user) of the user in the client or a bound bank card account number.

The process of obtaining the multiple two-dimensional codes can be as follows: The two-dimensional codes are obtained online from a server, or the client locally generates the two-dimensional codes.

Correspondingly, in an implementation, the obtaining multiple two-dimensional codes corresponding to the user can include: sending a first request used to request the multiple two-dimensional codes to the server, and receiving the multiple two-dimensional codes from the server. In another implementation, the obtaining multiple two-dimensional codes can include: generating the multiple two-dimensional codes based on seed data pre-obtained from a server. More specifically, in an example, the generating the multiple two-dimensional codes can include: generating the multiple two-dimensional codes by using a secure algorithm (for example, a hash algorithm) based on identification information of the user in the client, a current time, and the seed data. The pre-obtained seed data can include a token received from the server when the client is online.

After the multiple two-dimensional codes are obtained, then, in step 23, the multiple two-dimensional codes are sequentially displayed based on the predetermined time interval, so that the multiple two-dimensional codes form a visually dynamic two-dimensional code on the display page.

Specifically, the time interval can be predetermined based on an actual need, so that a dynamic two-dimensional code can be formed when the multiple two-dimensional codes are sequentially displayed on the display page based on the time interval. That is, it is perceived that the viewed two-dimensional code on the display page continuously changes. A ratio of the time interval to a validity period of each two-dimensional code is usually less than a predetermined threshold. For example, the predetermined threshold can be 0.0005 or 0.001.

In an implementation, the time interval is set to an order of milliseconds, and is far shorter than the validity period (which is usually 60 s) of the two-dimensional code. More specifically, in an example, with reference to a feature of a human visual system, for example, currently, it is generally considered that when pictures are continuously played at a frequency greater than 30 Hz (e.g., a corresponding time interval≤33 ms), a viewed image is perceived as continuously moving (that is, dynamically changing). In this case, the predetermined time interval can be set to 30 ms (<33 ms). Further, the predetermined time interval can be set to a shorter period such as 20 ms, so that each two-dimensional code displayed on the display page cannot be clearly determined by naked eyes. Alternatively, in another example, to reduce resources consumed by the server and/or the client for generating the two-dimensional codes, the time interval is set to, for example, 100 ms.

Figure 3:
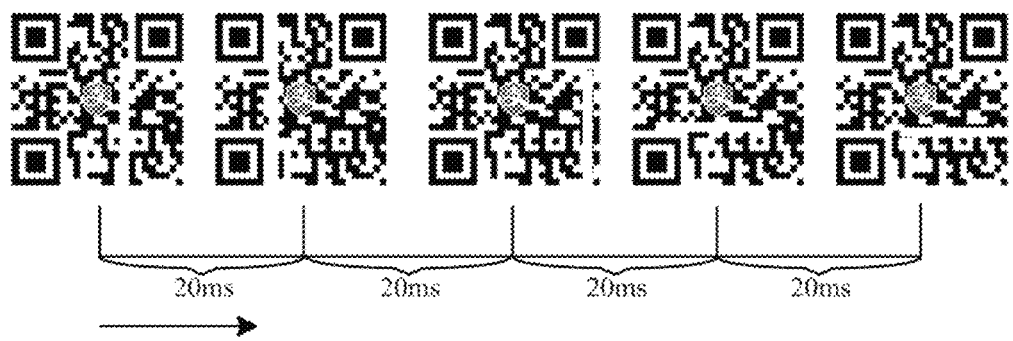
FIG. 3 is a schematic diagram illustrating a display page of a two-dimensional code, according to an example.

In an example, with reference to FIG. 3, the multiple two-dimensional codes are dynamically displayed. As shown in FIG. 3, assume that the predetermined time interval is 20 ms, and five two-dimensional codes are obtained in step 22. In this case, the five two-dimensional codes are sequentially displayed based on the time interval of 20 ms. Because 20 ms is a short time interval, in a continuous display process, the two-dimensional code on the display page is perceived as moving, each two-dimensional code cannot be clearly determined, and the quantity of two-dimensional codes displayed on the display page cannot be determined.

As such, the multiple obtained two-dimensional codes can be dynamically displayed.

It is worthwhile to note that in an implementation, the predetermined time interval used in step 23 can be received from the server. For example, in step 22, the predetermined time interval is requested when the multiple two-dimensional codes are requested from the server. Correspondingly, the data returned by the server to the client can include the predetermined time interval. Alternatively, the predetermined time interval can be preconfigured and stored in a program of the client. Correspondingly, the time interval can be directly read when the two-dimensional code needs to be displayed.

In addition, the predetermined time interval for displaying the two-dimensional codes and the validity period of the two-dimensional code are two different parameters, and the time interval (in an order of milliseconds, for example, 30 ms) for displaying the two-dimensional codes is far shorter than the validity period (on the order of seconds or minutes, for example, 60 s) of each of the multiple two-dimensional codes. This is different from a display method in which, only when a display time of a two-dimensional code reaches a validity period of the two-dimensional code, a new two-dimensional code is generated and displayed. In that display method, a time interval for displaying the two-dimensional code is consistent with the validity period of the two-dimensional code. In implementations described in this document, the multiple two-dimensional codes are displayed at a very short time interval (which is far shorter than the validity period), to form a visually dynamic two-dimensional code, thereby preventing the two-dimensional codes from being easily copied.

In an implementation, the multiple two-dimensional codes are sequentially generated (generated by the server or offline by the client) at a relatively high frequency (or a relatively short time interval), and are displayed based on the predetermined time interval. It can be understood that the time interval for generating the multiple two-dimensional codes needs to be shorter than or equal to the predetermined time interval for displaying the two-dimensional codes. In addition, both of the two time intervals are far shorter than the validity period of the two-dimensional code.

In another implementation, the multiple two-dimensional codes are obtained on a basis of group. That is, the multiple two-dimensional codes include multiple groups of two-dimensional codes, and each group includes a predetermined quantity N of two-dimensional codes. For example, in response to the request of the client, the server generates a group of N (for example, 10) two-dimensional codes at a time, and returns the group of N two-dimensional codes to the client, or the client generates a group of N two-dimensional codes at a time based on the pre-obtained seed data. Then, the group of two-dimensional codes are displayed based on the predetermined time interval. A next group of N two-dimensional codes are obtained before display the group of two-dimensional codes ends, and the next group of N two-dimensional codes are displayed after the group of two-dimensional codes are displayed.

In an implementation, the N two-dimensional codes in each group and two consecutive groups are displayed based on the same predetermined time interval. As such, the multiple consecutive groups of two-dimensional codes are continuously displayed at a constant rate, and a user cannot distinguish between an end of a group and a start of another group. In another implementation, the N two-dimensional codes in each group are displayed at a first time interval, and two consecutive groups are displayed at a second time interval. The first time interval is close to the second time interval. For example, the first time interval can be 20 ms, and the second time interval can be 25 ms. When both the first time interval and the second time interval are relatively small, and there is a small difference (for example, which is less than a predetermined ratio) between the first time interval and the second time interval, it is still difficult for a user to distinguish between groups by using a naked eye. However, when there is a relatively long second time interval, more time headroom can be reserved for reading and preparing a next group of two-dimensional codes.

In implementations described in this document, when the instruction for displaying a two-dimensional code is received from the user, the multiple two-dimensional codes are obtained, and the multiple obtained two-dimensional codes are sequentially displayed based on the predetermined time interval, so that the multiple two-dimensional codes form a dynamic two-dimensional code on the display page. As such, the two-dimensional code displayed on the display page can be effectively prevented from being copied and used, to avoid a loss to the user and/or a service provider.

The method for displaying a two-dimensional code in the implementations of the present specification is described above with reference to FIG. 2 and FIG. 3. A method for recognizing a two-dimensional code displayed according to the previous method is described below.

Figure 4:
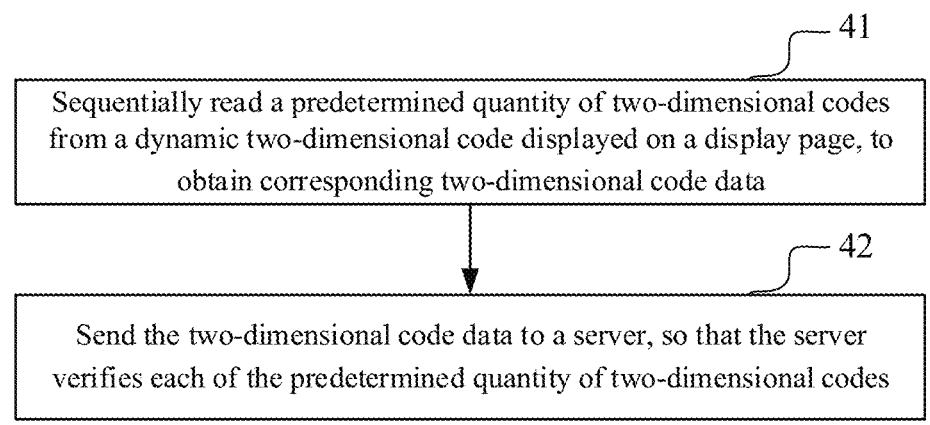
FIG. 4 is a flowchart illustrating a method for recognizing a two-dimensional code, according to an implementation.

FIG. 4 is a flowchart illustrating a method for recognizing a two-dimensional code, according to an implementation. The method can be performed by a service provider system, etc. for performing scanning recognition on a two-dimensional code, including a scanner, a gate, etc. As shown in FIG. 4, the method includes the following steps: Step 41: Sequentially read a predetermined quantity of two-dimensional codes from a dynamic two-dimensional code displayed on a display page, to obtain corresponding two-dimensional code data, where the dynamic two-dimensional code includes multiple two-dimensional codes sequentially displayed based on a predetermined time interval. Step 42: Send the two-dimensional code data to a server, so that the server verifies each of the predetermined quantity of two-dimensional codes.

First, in step 41, the predetermined quantity of two-dimensional codes are sequentially read from the dynamic two-dimensional code displayed on the display page, to obtain the corresponding two-dimensional code data, where the dynamic two-dimensional code includes the multiple two-dimensional codes sequentially displayed based on the predetermined time interval.

In an implementation, in step 41, the dynamic two-dimensional code is continuously read for at least a predetermined duration until the predetermined quantity of two-dimensional codes are read. The predetermined duration can be set based on the time interval for displaying the two-dimensional codes. For example, the time interval for displaying the two-dimensional codes is 30 ms, and the predetermined quantity of two-dimensional codes is 5. In this case, the predetermined duration can be set to at least 150 ms.

In another implementation, in step 41, the dynamic two-dimensional code is read based on a specific time interval (which is referred to as a third time interval here) until the predetermined quantity of two-dimensional codes are read. The third time interval can be determined based on a time interval for displaying the dynamic two-dimensional code. For example, the third time interval can be equal to the time interval for displaying the two-dimensional codes, namely, the predetermined time interval. In another example, the third time interval can be different from the time interval for displaying the two-dimensional codes. For example, the time interval for display is 20 ms, and the time interval for reading is 40 ms. That is, one two-dimensional code is read each time two two-dimensional codes are displayed. When the dynamic two-dimensional code is generated on a basis of group, and multiple groups of two-dimensional codes are not displayed at a constant rate (for example, the predetermined time interval in the previous implementation includes the first time interval and the second time interval), the third time interval can be more flexibly set based on the time interval for display.

In an implementation, the predetermined duration for reading the two-dimensional code and/or the third time interval can be pre-obtained from the server. In another implementation, the predetermined duration and/or the third time interval can be preconfigured in the service provider system.

In an implementation, the predetermined quantity of read two-dimensional codes can be pre-obtained from the server. Alternatively, the predetermined quantity can be written in a related interface program of the service provider system in advance, and the predetermined quantity can be directly invoked when the two-dimensional code is read. In addition, the predetermined quantity can be set based on a code scanning time that can be accepted by a user and the predetermined time interval for displaying the two-dimensional codes. For example, it is expected that display duration of the two-dimensional codes can be controlled to be within 1 s. Assume that the predetermined time interval is 20 ms. Therefore, the predetermined quantity can be set to 10, and in this case, 200 ms<1 s. As such, the code scanning time can be controlled to be within a range that can be accepted by the user, and the quantity of multiple two-dimensional codes displayed on the dynamic display page can be controlled to be not less than the predetermined quantity, so that the predetermined quantity of two-dimensional codes can be read. Further, the predetermined quantity can be subsequently adjusted based on related feedback data, for example, the quantity of complaint events that occur because a two-dimensional code of the user is stolen or an operation amount at which the server verifies the predetermined quantity of two-dimensional codes.

In an implementation, the obtained corresponding two-dimensional code data includes data corresponding to each of the predetermined quantity of read two-dimensional codes. In an implementation, the two-dimensional code data can include each digital sequence corresponding to each two-dimensional code, and each digital sequence can include corresponding user information, token information, a timestamp of the two-dimensional code, etc.

Next, in step 42, the two-dimensional code data is sent to the server, so that the server verifies each of the predetermined quantity of two-dimensional codes.

It is worthwhile to note that the server can verify each of the predetermined quantity of two-dimensional codes based on the received two-dimensional code data. Only when verification on each two-dimensional code succeeds, in other words, verification on all of the predetermined quantity of two-dimensional codes succeeds, the server determines that verification on the two-dimensional code data succeeds. Otherwise, the server determines that verification on the two-dimensional code data fails. In an implementation, verification on each two-dimensional code includes verification on a validity period of the two-dimensional code.

It can be seen from the previous description that in the method for recognizing a two-dimensional code provided in the present implementation of the present specification, the predetermined quantity of two-dimensional codes are first sequentially read from the dynamic two-dimensional code display page, to obtain the corresponding two-dimensional code data, and then the two-dimensional code data is sent to the server, so that the server verifies each of the predetermined quantity of two-dimensional codes, and determines that verification on the two-dimensional code data succeeds only when verification on all of the predetermined quantity of two-dimensional codes succeeds. As such, accuracy of recognition and verification results can be improved, to avoid a loss to a user and/or a service provider.

The method for generating a two-dimensional code, the method for displaying a two-dimensional code, the method for recognizing a two-dimensional code, and the method for verifying a two-dimensional code are described above. The methods provided in the implementations of the present specification are further described below with reference to an application scenario in FIG. 5. The application scenario is a specific example in which a payment is made to a brick and mortar merchant by using a two-dimensional code. Certainly, the methods provided in the implementations of the present specification can be applied to a scenario of "enjoy now, pay later", an identity authentication scenario, etc. The example shown in FIG. 5 constitutes no limitation on application scenarios of the implementations of the present specification.

Figure 5:
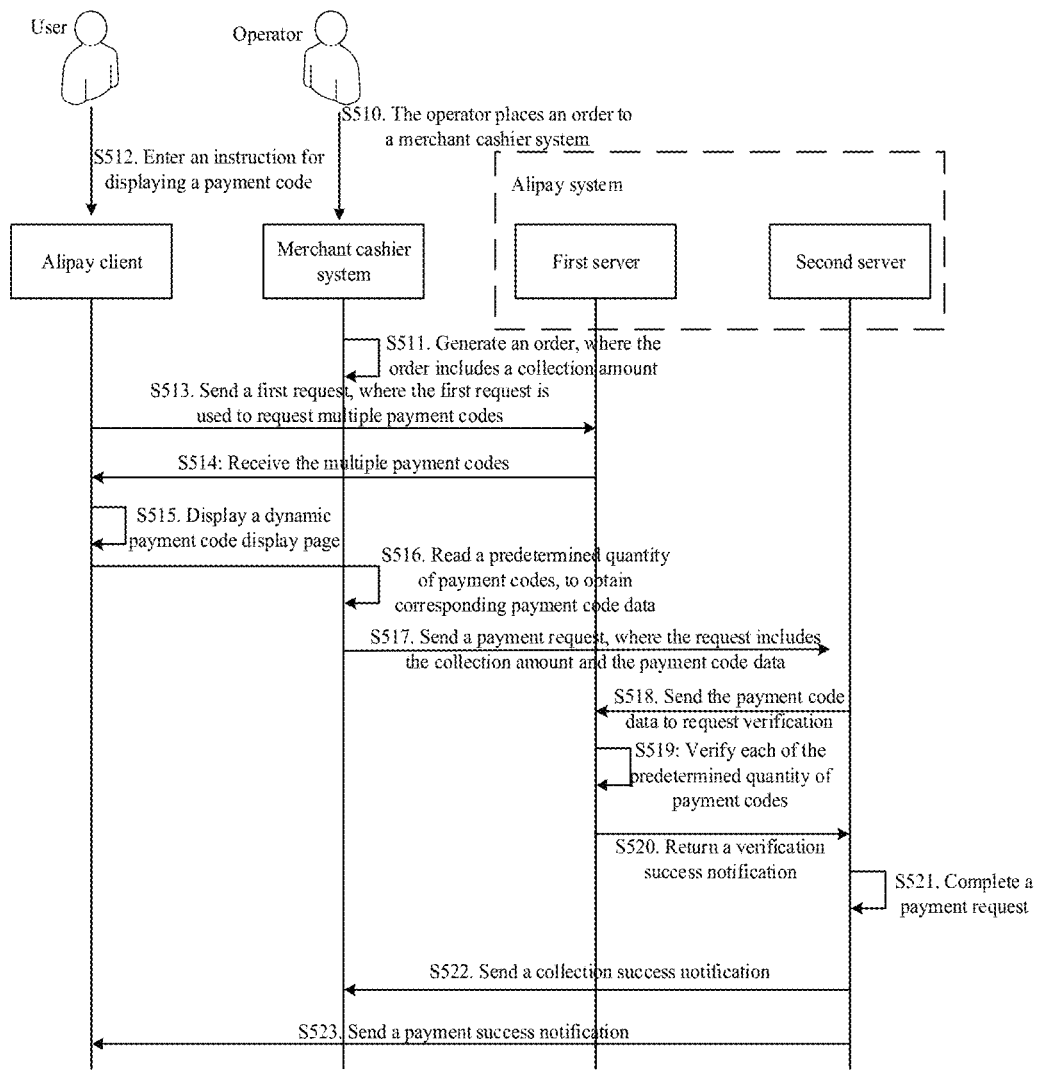
FIG. 5 is a schematic diagram illustrating an application process of a payment code, according to an example.

It is worthwhile to note that a server for generating a two-dimensional code and a server for verifying two-dimensional code data in a server can be an integrated server, or can be different servers. The latter case is used as an example in FIG. 5. The server is an ALIPAY system, a first server is configured to generate a two-dimensional code, and a second server is configured to interact with a merchant to perform data verification and make an order payment. In addition, an ALIPAY client of a user in FIG. 5 is in an online state. As shown in FIG. 5, the method can include the following steps.

Step S510: A merchant operator places an order to a merchant cashier system.

Step S511: The merchant cashier system generates an order, where the order includes a collection amount.

Step S512: The ALIPAY client receives an instruction for displaying a payment code from a user.

Step S513: The ALIPAY client sends a first request to the first server, where the first request is used to request multiple payment codes.

Step S514: The ALIPAY client receives the multiple payment codes from the first server.

Step S515: The ALIPAY client displays a dynamic payment code display page, and sequentially displays the multiple payment codes on the dynamic display page based on a predetermined time interval.

Step S516: The merchant cashier system sequentially reads a predetermined quantity of payment codes from the dynamic payment code display page, to obtain corresponding payment code data.

Step S517: The merchant cashier system sends a payment request to the second server, where the payment request includes the collection amount and the obtained payment code data.

Step S518: The second server sends the payment code data to the first server to request verification.

Step S519: The first server can verify each of the predetermined quantity of payment codes based on the received payment code data.

Specifically, the first server can compare the received payment code data with two-dimensional code data generated by the first server for the user, to verify accuracy of the two-dimensional codes. The first server can verify a validity period of the two-dimensional code. The first server determines that the verification succeeds only when verification on each payment code succeeds, in other words, verification on all of the predetermined quantity of payment codes succeeds.

Step S520: The first server returns a verification success notification to the second server.

Step S521: The second server deducts a corresponding amount from an account of the user based on the collection amount in the payment request, to transfer the corresponding amount to an account of the merchant.

Step S522: The second server sends a collection success notification to the merchant cashier system.

Step S523: The second server sends a payment success notification to the ALIPAY client.

As such, the process of making a payment to the merchant by the user by using the payment code is completed.

It can be understood from the previous description that when receiving the instruction for displaying a payment code from the user, the ALIPAY client obtains the multiple payment codes from the ALIPAY server, and sequentially displays the multiple obtained payment codes based on the predetermined time interval, so that the multiple payment codes form a dynamic payment code on the display page. In addition, the merchant cashier system sequentially reads the predetermined quantity of payment codes from the dynamic payment code display page, to obtain the corresponding payment data, and then sends the payment code data to the ALIPAY server, so that the server verifies each of the predetermined quantity of payment codes, and determines that verification on the payment code data succeeds only when verification on all of the predetermined quantity of payment codes succeeds. As such, the payment code displayed on the display page can be effectively prevented from being copied and used, and accuracy of recognition and verification results can be improved, to avoid a loss to the user.

Figure 6:
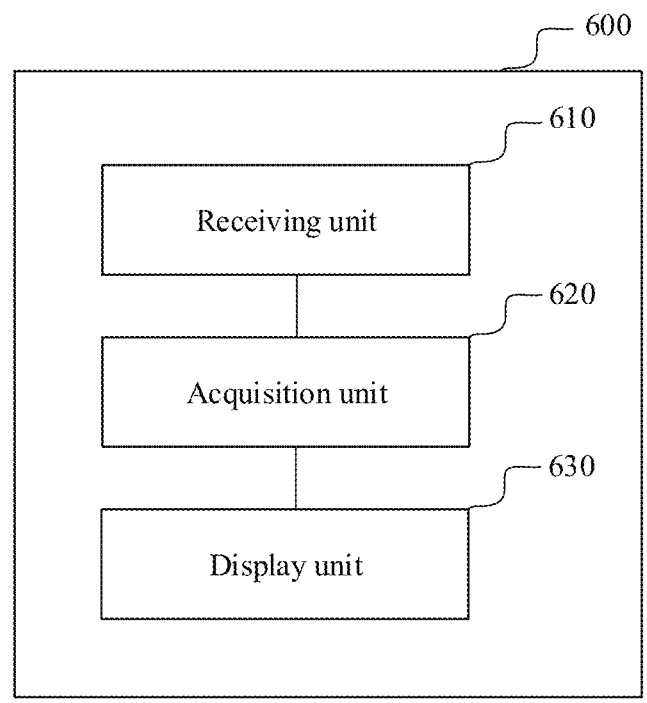
FIG. 6 is a schematic block diagram illustrating an apparatus for displaying a two-dimensional code, according to an implementation.

In an implementation of another aspect, an apparatus for displaying a two-dimensional code is further provided. FIG. 6 is a schematic block diagram illustrating an apparatus for displaying a two-dimensional code, according to an implementation. As shown in FIG. 6, the display apparatus 600 includes: a receiving unit 610, configured to receive an instruction for displaying a two-dimensional code from a user; an acquisition unit 620, configured to obtain multiple two-dimensional codes corresponding to the user; and a display unit 630, configured to sequentially display the multiple two-dimensional codes based on a predetermined time interval, so that the multiple two-dimensional codes form a dynamic two-dimensional code on a display page, where a ratio of the predetermined time interval to a validity period of each of the multiple two-dimensional codes is less than a predetermined threshold.

In an implementation, the acquisition unit 620 is specifically configured to send a first request to a server, where the first request is used to request the multiple two-dimensional codes; and receive the multiple two-dimensional codes from the server.

Further, the first request sent by the acquisition unit 620 is further used to request the predetermined time interval.

In an implementation, the acquisition unit 620 is specifically configured to generate the multiple two-dimensional codes based on seed data pre-obtained from a server.

In an implementation, the multiple two-dimensional codes obtained by the acquisition unit 620 include multiple groups of two-dimensional codes, and each of the multiple groups of two-dimensional codes includes a first quantity of two-dimensional codes; and the display unit 630 is specifically configured to display the first quantity of two-dimensional codes in each group based on a first time interval, and display each group of two-dimensional codes based on a second time interval.

According to the display apparatus 600, the receiving unit 610 receives the instruction for displaying a two-dimensional code from the user, the acquisition unit 620 obtains the multiple two-dimensional codes, and the display unit 630 sequentially displays the multiple obtained two-dimensional codes based on the predetermined time interval, so that the multiple two-dimensional codes form a dynamic two-dimensional code on the display page. As such, the two-dimensional code displayed on the display page can be effectively prevented from being copied and used, to avoid a loss to the user and/or a service provider.

Figure 7:
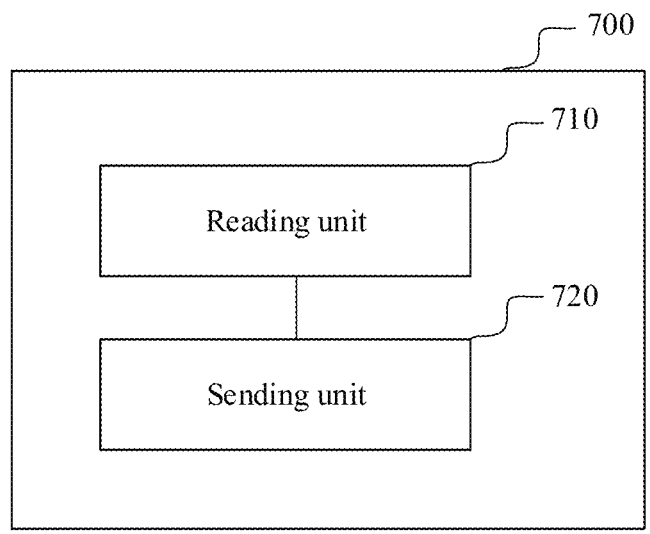
FIG. 7 is a schematic block diagram illustrating an apparatus for recognizing a two-dimensional code, according to an implementation.

In an implementation of another aspect, an apparatus for recognizing a two-dimensional code is further provided. FIG. 7 is a schematic block diagram illustrating an apparatus for recognizing a two-dimensional code, according to an implementation. As shown in FIG. 7, the recognition apparatus 700 includes: a reading unit 710, configured to sequentially read a predetermined quantity of two-dimensional codes from a dynamic two-dimensional code displayed on a display page, to obtain corresponding two-dimensional code data, where the dynamic two-dimensional code includes multiple two-dimensional codes sequentially displayed based on a predetermined time interval; and a sending unit 720, configured to send the two-dimensional code data to a server, so that the server verifies each of the predetermined quantity of two-dimensional codes.

In an implementation, the reading unit 710 is specifically configured to continuously read the dynamic two-dimensional code for at least predetermined duration until the predetermined quantity of two-dimensional codes are read.

In another implementation, the reading unit 710 is specifically configured to read the dynamic two-dimensional code based on a predetermined third time interval until the predetermined quantity of two-dimensional codes are read.

According to the recognition apparatus 700, the reading unit 710 sequentially reads the predetermined quantity of two-dimensional codes from the dynamic two-dimensional code display page, to obtain the corresponding two-dimensional code data, and then the sending unit 720 sends the two-dimensional code data to the server, so that the server verifies each of the predetermined quantity of two-dimensional codes, and determines that verification on the two-dimensional code data succeeds only when verification on all of the predetermined quantity of two-dimensional codes succeeds. As such, accuracy of recognition and verification results can be improved, to avoid a loss to a user and/or a service provider.

In an implementation of still another aspect, a computer-readable storage medium is provided. The computer-readable storage medium stores a computer program, and when the computer program is executed in a computer, the computer is enabled to perform the method described with reference to FIG. 2 or FIG. 4.

In an implementation of still another aspect, a computing device is further provided, and includes a memory and a processor. The memory stores executable code, and when the processor executes the executable code, the method described with reference to FIG. 2 or FIG. 4 is implemented.

A person skilled in the art should be aware that in the previous one or more examples, functions described in the present disclosure can be implemented by hardware, software, firmware, or any combination thereof. When the functions are implemented by software, the functions can be stored in a computer-readable medium or transmitted as one or more instructions or code in a computer readable medium.

The objectives, technical solutions, and beneficial effects of the present disclosure are further described in detail in the previously described specific implementations. It should be understood that the previous descriptions are merely specific implementations of the present disclosure, and are not intended to limit the protection scope of the present disclosure. Any modification, equivalent replacement, or improvement made based on the technical solutions of the present disclosure shall fall within the protection scope of the present disclosure.

What is claimed is:

1. A computer-implemented method, comprising:
 receiving, at a user device, an instruction for displaying a two-dimensional code;
 obtaining, by the user device, multiple two-dimensional codes corresponding to a user; and
 sequentially displaying, by the user device, the multiple two-dimensional codes based on a plurality of predetermined time intervals, so that the multiple two-dimensional codes form a dynamic two-dimensional code on a display page,
wherein a ratio of each of the plurality of predetermined time intervals to a validity period of each of the multiple two-dimensional codes is less than a predetermined threshold, wherein the multiple two-dimensional codes comprise multiple groups of two-dimensional codes, and each group of the multiple groups of two-dimensional codes comprises a corresponding first quantity of two-dimensional codes, and wherein sequentially displaying the multiple two-dimensional codes based on the plurality of predetermined time intervals comprises displaying the first quantity of two-dimensional codes in each group based on a first time interval, and sequentially displaying the multiple groups of two-dimensional codes based on a second time interval different from the first time interval.

2. The computer-implemented method of claim 1, wherein obtaining multiple two-dimensional codes corresponding to the user comprises:
sending, to a server, a first request for the multiple two-dimensional codes; and
receiving, at the user device, the multiple two-dimensional codes from the server in response to the first request.

3. The computer-implemented method of claim 2, further comprising receiving the plurality of predetermined time intervals in response to the first request.

4. The computer-implemented method of claim 1, wherein obtaining multiple two-dimensional codes corresponding to the user comprises generating the multiple two-dimensional codes based on seed data obtained from a server.

5. The computer-implemented method of claim 1, wherein each of the multiple two-dimensional codes comprises account information for an account of the user.

6. The computer-implemented method of claim 1, wherein each of the plurality of predetermined time intervals is less than or equal to 33 milliseconds.

7. The computer-implemented method of claim 1, wherein sequentially displaying the multiple two-dimensional codes based on the plurality of predetermined time intervals comprises, for each of multiple iterations, displaying, in a sequence, each two-dimensional code for a respective predetermined time period for the two-dimensional code.

8. The computer-implemented method of claim 1, wherein the validity period of each of the multiple two-dimensional codes comprises a time period for which the two-dimensional code is valid.

9. A non-transitory, computer-readable medium storing one or more instructions executable by a computer system to perform operations comprising:
receiving, at a user device, an instruction for displaying a two-dimensional code;
obtaining, by the user device, multiple two-dimensional codes corresponding to a user; and
sequentially displaying, by the user device, the multiple two-dimensional codes based on a plurality of predetermined time intervals, so that the multiple two-dimensional codes form a dynamic two-dimensional code on a display page,
wherein a ratio of each of the plurality of predetermined time intervals to a validity period of each of the multiple two-dimensional codes is less than a predetermined threshold, wherein the multiple two-dimensional codes comprise multiple groups of two-dimensional codes, and each group of the multiple groups of two-dimensional codes comprises a corresponding first quantity of two-dimensional codes, and wherein sequentially displaying the multiple two-dimensional codes based on the plurality of predetermined time intervals comprises displaying the first quantity of two-dimensional codes in each group based on a first time interval, and sequentially displaying the multiple groups of two-dimensional codes based on a second time interval different from the first time interval.

10. The non-transitory, computer-readable medium of claim 9, wherein obtaining multiple two-dimensional codes corresponding to the user comprises:
sending, to a server, a first request for the multiple two-dimensional codes; and
receiving, at the user device, the multiple two-dimensional codes from the server in response to the first request.

11. The non-transitory, computer-readable medium of claim 9, wherein sequentially displaying the multiple two-dimensional codes based on the plurality of predetermined time intervals comprises, for each of multiple iterations, displaying, in a sequence, each two-dimensional code for a respective predetermined time period for the two-dimensional code.

12. The non-transitory, computer-readable medium of claim 9, wherein the validity period of each of the multiple two-dimensional codes comprises a time period for which the two-dimensional code is valid.

13. A computer-implemented system, comprising:
one or more computers; and
one or more computer memory devices interoperably coupled with the one or more computers and having tangible, non-transitory, machine-readable media storing one or more instructions that, when executed by the one or more computers, perform one or more operations comprising:
receiving, at a user device, an instruction for displaying a two-dimensional code;
obtaining, by the user device, multiple two-dimensional codes corresponding to a user; and
sequentially displaying, by the user device, the multiple two-dimensional codes based on a plurality of predetermined time intervals, so that the multiple two-dimensional codes form a dynamic two-dimensional code on a display page,
wherein a ratio of each of the plurality of predetermined time intervals to a validity period of each of the multiple two-dimensional codes is less than a predetermined threshold, wherein the multiple two-dimensional codes comprise multiple groups of two-dimensional codes, and each group of the multiple groups of two-dimensional codes comprises a corresponding first quantity of two-dimensional codes, and wherein sequentially displaying the multiple two-dimensional codes based on the plurality of predetermined time intervals comprises displaying the first quantity of two-dimensional codes in each group based on a first time interval, and sequentially displaying the multiple groups of two-dimensional codes based on a second time interval different from the first time interval.

14. The computer-implemented system of claim 13, wherein obtaining multiple two-dimensional codes corresponding to the user comprises:

sending, to a server, a first request for the multiple two-dimensional codes; and receiving, at the user device, the multiple two-dimensional codes from the server in response to the first request.

15. The computer-implemented system of claim 13, wherein the validity period of each of the multiple two-dimensional codes comprises a time period for which the two-dimensional code is valid.

16. A computer-implemented method, comprising:

obtaining two-dimensional code data by sequentially reading a predetermined quantity of two-dimensional codes from multiple two-dimensional codes sequentially displayed on a display page based on a predetermined time interval, wherein the predetermined quantity of two-dimensional codes comprises multiple groups of two-dimensional codes, and each group of the multiple groups of two-dimensional codes comprises a corresponding first quantity of two-dimensional codes, and wherein the multiple two-dimensional codes are sequentially displayed based on a plurality of predetermined time intervals, wherein the first quantity of two-dimensional codes in each group is displayed based on a first time interval, and the multiple groups of two-dimensional codes are sequentially displayed based on a second time interval different from the first time interval; and sending the two-dimensional code data to a server for verification of each two-dimensional code of the predetermined quantity of two-dimensional codes.

17. The computer-implemented method of claim 16, wherein sequentially reading the predetermined quantity of two-dimensional codes is performed for at least predetermined duration until the predetermined quantity of two-dimensional codes are read.

\* \* \* \* \*